US006255435B1

(12) United States Patent
Hait et al.

(10) Patent No.: US 6,255,435 B1
(45) Date of Patent: Jul. 3, 2001

(54) METHOD OF CRYSTALLIZING POLYCARBONATE PREPOLYMER

(75) Inventors: Sukhendu Bikash Hait, Tuscaloosa, AL (US); James Day, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/371,452

(22) Filed: Aug. 10, 1999

(51) Int. Cl.$^7$ .................................................... C08G 64/00
(52) U.S. Cl. ............................................ 528/196; 528/198
(58) Field of Search ...................................... 528/196, 198

(56) References Cited

U.S. PATENT DOCUMENTS

| | | | |
|---|---|---|---|
| 3,541,200 | 11/1970 | Niegisch | 528/196 |
| 3,546,331 | 12/1970 | Niegisch | 528/196 |
| 4,644,049 | 2/1987 | Tung et al. | 528/272 |
| 4,948,871 | 8/1990 | Fukuoka et al. | 528/481 |
| 5,905,135 | 5/1999 | Idage et al. | 528/196 |
| 6,031,063 | 2/2000 | Day et al. | 528/196 |

FOREIGN PATENT DOCUMENTS

| | | |
|---|---|---|
| 4656269 | 7/1971 | (JP) . |
| 9845351 | 10/1998 | (WO) . |

OTHER PUBLICATIONS

E. Turska et al., "Studies of Liquid–Induced Crystallization of Bisphenol A Polycarbonate," Journal of Applied Polymer Science, vol. 23, (1979) John Wiley & Sons, Inc., pp. 3489–3500.
Robert A. Ware et al., "Diffusion and Induced Crystallization in Polycarbonate," Journal of Applied Polymer Science, vol. 26, (1981), John Wiley & Sons, Inc., pp. 2975–2988.
J. P. Mercier et al., "Some Aspects of Vapor–Induced Crystallization of Polycarbonate of Bisphenol A," Journal of Polymer Science: Part C, No. 16, (1967) pp. 2059–2066.
James M. Jonza et al., "High–Melting Bisphenol–A Polycarbonate from Annealing of Vapor–Induced Crystals,"Journal of Polymer Science: Part B: Polymer Physics, Vol. 24, (1986), Johnn Wiley & Sons, Inc., pp. 2459–2472.
No information or date etc.

*Primary Examiner*—Terressa M. Boykin
(74) *Attorney, Agent, or Firm*—Noreen C. Johnson; Douglas E. Stoner

(57) ABSTRACT

A method of crystallizing an aromatic polycarbonate prepolymer having a molecular weight of from about 1,000 to about 20,000 and having from about 5 to about 95 mole % aryl carbonate terminal end groups, based on total end groups, the method comprising effecting contact of the prepolymer with a crystallizing agent comprising an alcohol and an additive, wherein the additive is effective to increase the rate of solid state polymerization.

20 Claims, 1 Drawing Sheet

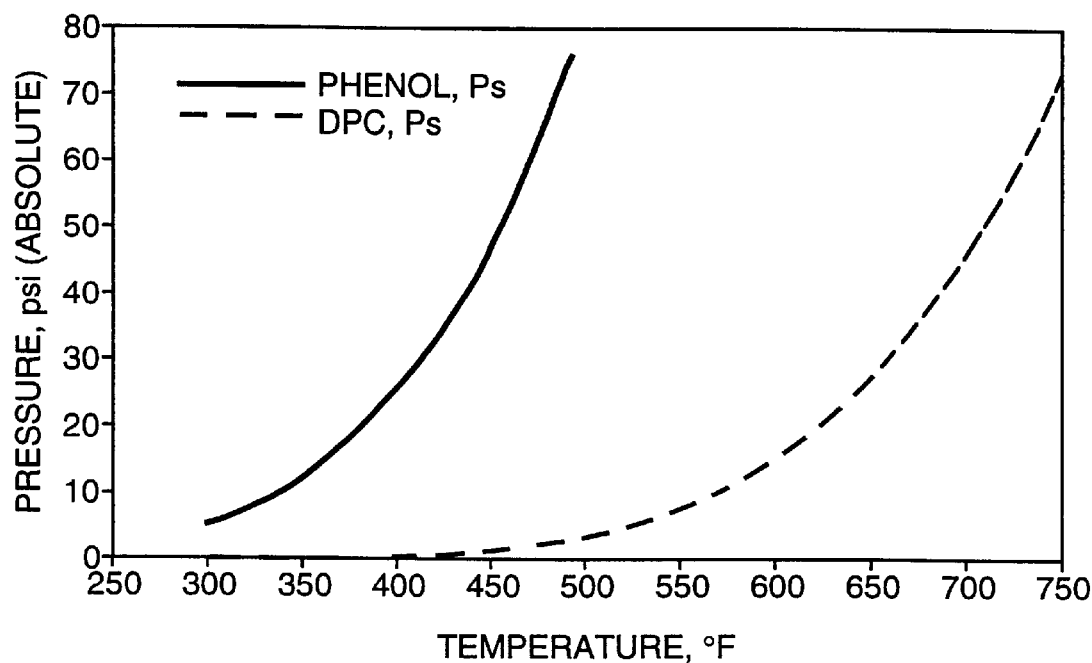

METHOD OF CRYSTALLIZING POLYCARBONATE PREPOLYMER

BACKGROUND OF THE INVENTION

In solid state polymerization, or "SSP", a high molecular weight polymer is produced by first preparing a relatively low molecular weight crystallized prepolymer followed by its conversion to a higher molecular weight material in the solid state. A solid phase polymerization process is made possible by the ability of both the starting molecular weight material and the product high polymer to sustain temperatures above the glass transition temperature without fusion of the polymer. The temperature at which the process is conducted must be sufficient to effect chain growth and the attendant increase in $M_w$.

Solid state polymerization (SSP) of polycarbonates is disclosed, for example, in U.S. Pat. Nos. 4,948,871, 5,204, 377 and 5,214,073. Typically, SSP involves three steps: a first step of forming a prepolymer, typically by melt polymerization (i.e. transesterification) of a dihydroxyaromatic compound such as bisphenol A with a diaryl carbonate, such as diphenyl carbonate; a second step of crystallizing the prepolymer; and a third step of building the molecular weight of the crystallized prepolymer by heating to a temperature between its glass transition temperature and its melting temperature. The second or crystallization step as disclosed in these patents is by solvent treatment or heat treatment.

There exists a need for an improved method for crystallizing the polycarbonate prepolymer.

There exists a further need for a prepolymer in a form which may be readily processed to produce polycarbonate having improved properties.

There exists a further need for a process in which the in which the rate of solid state polymerization may be effectively increased.

There further exists a need for a SSP process which may be conducted at shorter processing times.

There further exists a need for a SSP process in which the process may be conducted in fewer stages.

BRIEF SUMMARY OF THE INVENTION

In a first aspect, the invention relates to a method of crystallizing an aromatic polycarbonate prepolymer having a weight average molecular weight of from about 1,000 to about 20,000 and having from about 5 to about 95 mole % aryl carbonate terminal end groups, based on total end groups, the method comprising:

a) contacting the prepolymer with a crystallization agent comprising an alcohol or alcohols under conditions effective to crystallize the prepolymer.

Optionally, the crystallization agent may comprise an additive. The crystallization agent preferably comprises at least 95% by weight of the alcohol or alcohols.

In one embodiment of this aspect of the invention, the invention relates to a method of crystallizing an aromatic polycarbonate prepolymer having a weight average molecular weight of from about 1,000 to about 20,000 and having from about 5 to about 95 mole % aryl carbonate terminal end groups, based on total end groups, the method comprising:

a) contacting the prepolymer with an agent comprising a secondary alcohol, wherein the secondary alcohol is applied to the prepolymer in the vapor phase.

In a further embodiment, this aspect of the invention relates to a method a method of increasing the rate of solid state polymerization during preparation of an aromatic polycarbonate from a prepolymer, the method comprising:

a) contacting the prepolymer with a crystallizing agent comprising an alcohol and an additive, the additive comprising a substance effective to increase the rate of solid state polymerization.

In a further embodiment, this aspect of the invention relates to a method of controlling the thermal crystallization of a prepolymer having a weight average molecular weight of from about 1,000 to about 20,000 and having from about 5 to about 95 mole % aryl carbonate terminal end groups, based on total end groups, the method comprising the step of:

a) applying a crystallizing agent comprising an alcohol or alcohols to the prepolymer.

Optionally, the crystallization agent may comprise an additive. The crystallization agent preferably comprises at least about 95% by weight of the alcohol or alcohols.

In a second aspect, the invention relates to a method of preparing cellular pellets from a prepolymer comprising a blowing agent, the method comprising the steps of:

a) extruding the prepolymer through a die, the die maintained at conditions such that the blowing agent remains in the condensed phase in the prepolymer prior to emerging from the die, and b) upon emergence of the prepolymer through the die, substantially simultaneously cooling the prepolymer by contacting the prepolymer with a cooling agent and cutting the prepolymer; the conditions outside the die being maintained such that the blowing agent vaporizes in the prepolymer to form pores.

In one embodiment, the second aspect of the invention relates to a method of preparing cellular pellets comprising an aromatic polycarbonate prepolymer having a weight average molecular weight of from about 1,000 to about 20,000 and having from about 5 to about 95 mole % aryl carbonate terminal end groups, based on total end groups, the aromatic polycarbonate prepolymer further comprising a blowing agent, the method comprising:

a) extruding the aromatic polycarbonate prepolymer through a die, the die maintained at conditions such that the blowing agent remains in the condensed phase prior to emerging from the die, and b) upon emergence of the aromatic polycarbonate prepolymer through the die, substantially simultaneously cooling the aromatic polycarbonate prepolymer by contacting the aromatic polycarbonate prepolymer with a cooling agent and cutting the aromatic polycarbonate prepolymer; the conditions outside the die being maintained such that the blowing agent vaporizes in the aromatic polycarbonate prepolymer to form pores.

In a further embodiment of this second aspect of the invention, the cellular pellets are crystallized by effecting contact with an agent comprising an alcohol and further subjected to a process of solid state polymerization.

Additional advantages of the invention will be set forth in the description which follows. The advantages of the invention will be realized and attained by means of the elements and combinations set forth in the appended claims. It is to be understood that both the foregoing general description and the following detailed description are exemplary only, and not restrictive of the invention, as claimed.

BRIEF DESCRIPTION OF THE DRAWINGS

FIG. 1 is a graph of plot of the saturation vapor pressure of pure phenol and pure diphenyl carbonate versus temperature. Phenol and diphenyl carbonates are by-products of aromatic polycarbonate synthesis.

DETAILED DESCRIPTION OF THE INVENTION

The present invention may be understood more readily by reference to the following detailed description of the preferred embodiments of the invention and the examples included therein.

Before the present method and apparatus are disclosed and described, it is to be understood that this invention is not limited to specific systemic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

"Nonsolvent" is herein defined as a substance having a prepolymer solubility of less than 10%.

"Solvent" is herein defined as substance that penetrates the prepolymer.

"Cellular pellet" is herein defined as a pellet containing internal voids.

"Essentially pure" is herein defined as 99% by weight or greater of the referenced material. "

Agglomerated pellet" is herein defined as a pellet formed from powder particulate which has been densified.

In a first aspect, the present invention concerns a method of crystallizing a polycarbonate prepolymer by effecting contact between the prepolymer and an agent comprising an alcohol. Optionally, the crystallization agent may further comprise an additive. The polycarbonate prepolymer may be further polymerized by SSP.

In a second aspect, the invention concerns the preparation of cellular pellets from a prepolymer by a pelletization process. In one embodiment, the prepolymer may be polycarbonate. The cellular pellets may optionally be treated by effecting contact of the cellular pellets with an agent comprising an alcohol. The prepolymer may be further polymerized by SSP.

More particularly, the second aspect of the invention includes a method in which a polymer feedstock comprising a blowing agent is processed under conditions such that a cellular pellet is formed. In one embodiment, the blowing agent is present in the polymer feedstock as a byproduct of the preparation of the polymer feedstock. In another embodiment, the blowing agent may be introduced into the feedstock.

Although the method of making the cellular pellets is not limited to polycarbonate prepolymer, the method is suitable for preparing cellular pellets of polycarbonate prepolymer, which may be crystallized and subjected to further molecular weight increase by SSP. Optionally, the crystallization of the cellular pellets may be effected by treatment with the crystallization agent comprising an alcohol as described in the first aspect of the invention.

I. Polycarbonate Prepolymer Crystallization

As mentioned, in a first aspect, the invention concerns a method of crystallization of a polycarbonate prepolymer comprising effecting contact of the polycarbonate prepolymer with an agent comprising an alcohol. This agent is herein referred to as a "crystallizing agent" or a "crystallization agent". The agent may optionally comprise an additive or additives. The polycarbonate prepolymer that is treated with the crystallization agent may be in any form suitable for processing, including, but not limited to, a powder, a pellet, an agglomerated pellet, or a cellular pellet.

In one embodiment of the present invention there is provided a method of crystallizing an aromatic polycarbonate prepolymer having a weight average molecular weight in the range of about 1,000 to about 20,000, and having in the range of about 5 to about 95 mole % aryl carbonate terminal end groups based on total end groups. The method generally includes the step of effecting contact of the prepolymer with a crystallizing agent comprising an alcohol to form a crystallized prepolymer. Optionally, the prepolymer may first be obtained by contacting a dihydroxy diaryl compound with a diaryl carbonate to form a polycarbonate prepolymer having a weight average molecular weight in the range of about 1,000 to about 20,000 and having in the range of about 5 to about 95 mole % aryl carbonate terminal end groups based on total end groups.

The polycarbonate prepolymer typically comprises structural units of the formula III

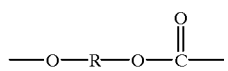

III wherein at least about 60% of the total number of R groups are aromatic organic radicals and the balance thereof are aliphatic, alicyclic or aromatic radicals. Preferably, each R is an aromatic organic radical and more preferably a radical of the formula

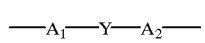

IV wherein each $A_1$ and $A_2$ is a monocyclic divalent aryl radical and Y is a bridging radical in which one or two carbonate atoms separate $A_1$ and $A_2$. Such radicals may be derived from dihydroxyaromatic compounds of the formulas Oh—R—OH and OH—$A_1$—Y—$A_2$—OH, or their corresponding derivatives. $A_1$ and $A_2$ include but are not limited to unsubstituted phenylene, preferably p-phenylene or substituted derivatives thereof. The bridging radical Y is most often a hydrocarbon group and preferably a saturated group, such as methylene, cyclohexylidene or isopropylidene. Isopropylidene is the more preferred. Thus, the more preferred polycarbonates are those comprising residues of 2,2-bis(4-hydroxyphenyl)propane, also known as "bisphenol A". In one embodiment, the prepolymer is a homopolymer of bisphenol A. It is preferable that the aromatic polycarbonate prepolymer have a $T_g$ of from about 1000° C. to about 150° C., more preferably about 1100° C.

A prepolymer of a (co)polyestercarbonates may also be prepared by the method of this invention. The polyestercarbonate may comprise residues of aliphatic or aromatic diacids. The corresponding derivatives of aliphatic or aromatic diacids, such as the corresponding dichlorides, may also be utilized in the polymerization.

Polyfunctional compounds may also be introduced into the reaction to produce, for example, branched polycarbonate prepolymer.

Suitable bisphenols or diphenols which may be used in the preparation of the prepolymer include, but are not limited to, resourcinol,
4-bromoresourcinol,
hydroquinone,
4,4'-dihydroxybiphenyl,
1,6-dihydroxynapthalene,
bis(4-hydroxyphenyl)methane,
bis(4-hydroxyphenyl)diphenylmethane,
bis(4-hydroxyphenyl)-1-napthylmethane,
1,1-bis(4-hydroxyphenyl)ethane,
1,2-bis(4-hydroxyphenyl)ethane,
1,1-bis(4-hydroxyphenyl)phenylethane,
2,2-bis(4-hydroxyphenyl)propane ("bisphenol A"),
2-(4-hydroxyphenyl)-2-)3-hydroxyphenyl)propane,
2,2-bis(4-hydroxyphenyl)butane,
1,1-bis(4-hydroxyphenyl)isobutane,
1,1-bis(4-hydroxyphenyl)cyclohexane,
trans-2,3-bis(4-hydroxyphenyl)-2-butene,
2,2-bis(4-hydroxyphenyl)adamantane,
α,α'-bis(4-hydroxyphenyl)toluene,
bis(4-hydroxyphenyl)acetonitrile,
2,2-bis(3-methyl-4-hydroxyphenyl)propane,
2,2-bis(3-ethyl-4-hydroxyphenyl)propane,
2,2-bis(3-n-propyl-4-hydroxyphenyl)propane,
2,2-bis(3-sec-butyl-4-hydroxyphenyl)propane,
2,2-bis(3-t-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-methoxy-4-hydroxyphenyl)propane,
2,2-bis(3,5-dimethyl-4-hydroxyphenyl)propane,
2,2-bis(2,3,5,6-tetramethyl-4-hydroxyphenyl)propane,
2,2-bis(3,5-dichloro-4-hydroxyphenyl)propane,
2,2-bis(3,5-dibromo-4-hydroxyphenyl)propane,
2,2-bis(2,6-dibromo-3,5-dimethyl-4-hydroxyphenyl)propane,
α,α-bis(4-hydroxyphenyl)toluene,
α,α,α',α'-tetramethyl-(α,α'-bis(4-hydroxyphenyl)p-xylene,
2,2-bis(4-hydroxyphenyl)hexafluoropropane,
1,1-dichloro-2,2-bis(4-hydroxyphenyl)ethylene,
1,1-dibromo-2,2-bis(4-hydroxyphenyl)ethylene,
1,1-dichloro-2,2-bis(5-phenoxy-4-hydroxyphenyl)ethylene,
4,4'-dihydroxybenzophenone,
3,3-bis(4-hydroxyphenyl)-2-butanone,
1,6-bis(4-hydroxyphenyl)-1,6-hexanedione,
ethylene glycol bis(4-hydroxyphenyl)ether,
bis(4-hydroxyphenyl)ether,
bis(4-hydroxyphenyl)sulfide,
bis(4-hydroxyphenyl)sulfoxide,
bis(4-hydroxyphenyl)sulfone,
bis(3,5-dimethyl-4-hydroxyphenyl)sulfone,
9,9-bis(4-hydroxyphenyl)fluorene,
2,7-dihydroxypyrene,
6,6'-dihydroxy-3,3,3',3'-tetramethylspiro(bis)indane ("spirobiindane bisphenol"),
3,3-bis(4-hydroxyphenyl)phthalide,
2,6-dihydroxydibenzo-p-dioxin,
2,6-dihydroxythianthrene,
2,7-dihydroxyphenoxathiin,
2,7-dihydroxy-9,10-methylphenazine,
3,6-dihydroxydibenzofuran,
3,6-dihydroxydibenzothiophene,
2,7-dihydroxycarbazole,
4,4-bis(4-hydroxyphenyl)heptane,
2,2-bis(4-hydroxyphenyl)hexane, and other halogenated or alkylated derivatives. It is also possible to use mixtures of mono- and/or bischloroformates of the desired bisphenol or mono- and/or bischloroformate oligomeric carbonate mixtures of the desired bisphenol. 2,2-bis(4-hydroxyphenyl)propane (or bisphenol A) is the preferable bisphenol.

Suitable polyfunctional compounds used in the polymerization of branched polycarbonate include, but are not limited to, 1,1,1-tris(4-hydroxyphenyl)ethane,
4-[4-[1,1-bis(4-hydroxyphenyl)-ethyl]-dimethylbennzyl],
trimellitic anhydride,
trimellitic acid, or their acid chloride derivatives.

Suitable dicarboxylic acids or dicarboxylic dichlorides which may be used with bisphenols in the polymerization of polyester carbonates include, but are not limited to, 1,10-decane dicarboxylic acid,
1,12-dodecane dicarboxylic acid,
terephthalic acid,
isophthalic acid,
terephthaloyl dichloride, and isophthaloyl dichloride.

It should be understood that any suitable method of making the polycarbonate prepolymer, including catalytic and noncatalytic methods may be utilized in the present invention. Such methods include, but are not limited to the interfacial process and the melt process. It is preferable to conduct the preliminary polymerization in a molten state as it typically yields a mixture of capped and uncapped oligomers, and the melt process does not require the introduction of chlorinated solvents.

The crystallization agent comprises a primary alcohol, more preferably a tertiary alcohol, even more preferably a secondary alcohol. Mixtures of primary, secondary and tertiary alcohols and any combination thereof may also be used in the crystallization agent. In one embodiment of the invention, the crystallization agent is essentially pure alcohol. Alcohol is a nonsolvent for the polycarbonate prepolymer. In particular, the alcohols of the crystallization agent have a prepolymer solubility of less than about 10%, preferably less than about 5%.

If primary alcohols are present in the crystallization agent the primary alcohol or alcohols preferably a boiling point of less than about 250° C., more preferably less than about 200° C., even more preferably less than about 180° C. Suitable primary alcohols include $C_1$–$C_{10}$ alcohols including, but are not limited to, methanol, ethanol, propanol, butanol, pentanol, hexanol, isobutanol, neopentyl alcohol and mixtures thereof. Methanol, butanol, pentanol and mixtures thereof are the more preferred. In one embodiment of the invention, branched primary alcohols are utilized.

If secondary alcohols are present in the crystallization agent, the secondary alcohol or alcohols preferably having a boiling point of less than about 250° C., more preferably less than about 200° C., even more preferably less than about 180° C. Suitable secondary alcohols include $C_1$–$C_{10}$ alcohols, including but not limited to, 2-propanol (isopropanol), 3-pentanol, sec-butanol, 2-octanol, 2-decanol and mixtures thereof. Isopropanol is preferred.

If tertiary alcohols are present in the crystallization agent, the tertiary alcohol or alcohols preferably having a boiling point of less than about 250° C., preferably less than about 200°C., even more preferably less than about 180° C. Suitable tertiary alcohols include $C_1$–$C_{10}$ alcohols, including but not limited to, t-butanol.

In addition to the primary, secondary and tertiary alcohols, diols and triols may also optionally be used in the crystallization agent. Suitable diols include, but are not limited to any aliphatic or cycloaliphatic diol having from about 2 to a about 10 carbon atoms and mixtures thereof. Preferred diols include ethylene diol, 1,3-trimethylene diol, propylene diol, tripropylene diol, 1,4-butanediol, diethylene diol, neopentyl diol and mixtures thereof.

The crystallization agent may optionally comprise one or more polyol components. A polyol is herein defined as a polyhydric alcohol containing three or more hydroxyl groups; while a diol is herein defined as a dihydric alcohol. Representative polyol components that may be used in the crystallization agent include, but are not limited to, glycerol, trimethylolpropanate, pentaerythritol, 1,2,6-hexanetriol, dipentaerythritol and mixtures thereof.

The crystallization agent preferably comprises at least about 95% by weight of alcohol, more preferably at least about 99% by weight of the alcohol. The crystallization agent may be an essentially pure primary alcohol, an essentially pure tertiary alcohol, or an essentially pure secondary alcohol. In one embodiment of the invention the crystallization agent is essentially pure secondary alcohol applied in the vapor phase.

The crystallization agent which contacts the prepolymer may be in the liquid phase or the vapor phase. By "vapor phase" it is to be understood that the crystallization agent is in a single phase, and is in the form of a vapor. Optionally, contact of the crystallization agent comprising the alcohol may be effected under conditions such that there is liquid in the system as well.

Contact of the crystallizing agent comprising alcohol with the prepolymer may be effected in a variety of ways under a variety processing conditions such that the desired crystallinity of the prepolymer is obtained. The crystallinity in the prepolymer after treatment with the crystallization agent is preferably in the range of between about 5 and 70% preferably between about 20 and 40%, even more preferably between about 22 and 30% of the prepolymer.

Although a uniform coating of the crystallizing agent on the surface of the prepolymer is not required, it is desirable that contact is effected so as to distribute the crystallizing agent on the surface of essentially all the prepolymer. The crystallizing agent will preferably be present on the prepolymer in an amount effective to effect the desired crystallinity. The crystallization agent is preferably applied to the prepolymer in amounts of from about 2 wt % to about 30 wt %, more preferably in amounts of about 5 wt % to about 10 wt %, based on the weight of the prepolymer.

Contact of the crystallizing agent with the prepolymer may be effected in any manner to achieve the desired crystallinity. As mentioned, the crystallization agent may be in the vapor or liquid phase, or both.

If the crystallization agent is applied in liquid form, contact may be effected by placing or submerging the prepolymer in a liquid bath of the crystallizing agent, by spraying the crystallizing agent on the prepolymer, or by stirring, tumbling or agitating a mixture of the prepolymer and the crystallizing agent.

If the crystallization agent is in the vapor form, contact may be effected by any means which brings the vapor in contact with the prepolymer. The prepolymer may be in any form suitable for processing, including, but not limited to, a pellet, a cellular pellet, an agglomerated pellet or a powder. For instance, contact may be effected by placing the prepolymer in a vessel in which the crystallization agent is in the vapor form, or by placing the prepolymer in open or pressurized vessel in which the crystallization agent is in liquid form and subsequently heating the vessel to vaporize the crystallization agent.

In one embodiment, in which contact of the crystallizing agent with the prepolymer is effected in the vapor phase, the prepolymer is introduced into a pressurizable vessel and suspended on a screen. The crystallizing agent comprising an alcohol is introduced into the vessel and heated to the boiling point of the alcohol for a period of time sufficient to produce the desired crystallinity of the prepolymer. In an alternative embodiment, the vapor may also be heated and subsequently introduced into a pressurizable vessel.

In a further embodiment of the invention, pellets are placed in an evacuated vessel, which may be heated. The vessel is heated to a temperature such that the alcohol evaporates immediately upon the introduction of the crystallization agent into the evacuated vessel. It is preferable that the alcohol be completely in the vapor phase in this embodiment.

It is preferable to effect contact of the crystallization agent comprising the alcohol at a temperature of at least about 75° C., the temperature defined by the relationship:

$$T_c \geq T_b - z$$

wherein $T_c$ is the contact temperature, $T_b$ is the boiling point of the crystallization agent (both in degrees C) and z is a constant whose value is 60° C.

If applied in the vapor phase, contact of the crystallizing agent comprising the alcohol is preferably effected at temperatures between the boiling point of the crystallization agent and 150° C. Preferable contact temperatures are in the range of between about 140° C. to about 150° C., more preferably about 145° C. The pressure may be maintained at any pressure as long as the prepolymer is in contact with the crystallization agent.

Since the $T_g$ of the polycarbonate prepolymer is preferably in the range of about 100° C. to about 150° C., more preferably about 110° C., it may be necessary to ramp the temperature from below the $T_g$ of the prepolymer up to the preferred contact temperatures, if, for instance, the $T_g$ of the prepolymer is below the preferable contact temperatures. This allows the prepolymer to develop a level of crystallinity that will prevent agglomeration at the contact temperatures. This rate of heating may vary depending on the particular polycarbonate composition, suitable heating rates for this purpose are typically in the range of about 3 degrees Celsius/minute.

The time required for contact with the crystallization agent comprising the alcohol will vary according to the composition of the crystallization agent and the conditions of contact, such as the quantity of crystallization agent available and temperature. Generally, times in the range of about 15 to about 60 minutes are sufficient to achieve the desired level of crystallinity. The desired level of crystallinity is the level of crystallinty necessary to allow SSP to take place without fusion of the particulate prepolymer.

The choice of whether to use liquid or vapor phase contact of the crystallization agent depends on a number of factors. One factor is that the prepolymer comprises low molecular weight oligomers, herein referred to as "lows". Lows have a number average molecular weight of less than about 1500. If the crystallization agent is applied in the liquid phase, the lows tend to leach out of the prepolymer, thereby creating material that must be recycled or removed from the process. If the crystallization agent is applied in the vapor phase, the lows tend to remain in the prepolymer. However, it is advantageous to leach the lows out of the prepolymer as the molecular weight of the crystallized prepolymer in subsequent SSP increases at a faster rate.

The polycarbonate prepolymer treated with the crystallization agent preferably comprising at least about 95% by weight of an alcohol as described herein are especially advantageous for use as a prepolymer feedstock for solid state polymerization to produce higher molecular weight polycarbonates. Accordingly, the present process may be especially advantageous as part of an overall process for making a higher molecular weight polycarbonate, for example, by solid state polymerization.

Addition of Additives to the Crystallization Agent

Optionally, the crystallization agent comprising the alcohol may comprise an additive. An additive is a component in the crystallization agent, in addition to the alcohol. Suitable additives include, but are not limited to polymerization processing aids such as plasticizers, mold release agents, ketones or mixtures thereof. Other additives may include diluents or other mixing agents, including for example water and dialkyl carbonates.

Suitable plasticizers which may be included as additives in the crystallization agent, include, but are not limited to, tetraethylene glycol dimethyl ether, dioctyl phthalate, dibutyl phthalate, n-butyl stearate, triethylene glycol di(caprylate-caprate) glycoeryl trioleate, di(2-ethylhexyl sebacate) and mixtures thereof. Typically, plasticicers reduce the $T_g$ of the prepolymer.

Suitable mold release agents which may be included as additives in the crystallization agent include, but are not limited to glycerol monostearate, pentaerythritol tetrastearate and mixtures thereof.

Suitable ketones which may be included as additives in the crystallization agent include, but are not limited to, methyl ethyl ketone, acetone, 4 methyl pentanone, cyclohexanone and isobutyl methyl ketone. Acetone is the more preferred ketone.

The additive or additives preferably have boiling points such that they are in the vapor phase when the alcohol is in the vapor phase. Typically, the additive or additives, if present, comprise from about 0.5 to about 5% by weight of the crystallization agent, and the alcohol from about 95 to about 99.5% by weight of the crystallization agent.

The particular amount of a given additive or additives is dependent on the nature of the additive and its effect on the processing of the polycarbonate. The plasticizers and mold release agents should preferably be applied in amount of from about 50 ppm to about 3% by weight of the prepolymer, more preferably from about 300 ppm to about 1% of the prepolymer, and preferably comprise no more than about 2% by weight of the crystallization agent.

In contrast, if a ketone is used as an additive in the crystallization agent comprising alcohol, the ketone may comprise a greater percentage, by weight, of the crystallization agent than, for instance, than plasticizers or mold release agent without introducing deleterious effects in processing. A ketone may comprise for instance, about 20% by weight of the crystallization agent, more preferably about 10% by weight of the crystallization agent, even more preferably from about 1% to about 5% of the crystallization agent. Alternatively, a carbonyl containing compound, such as dimethyl carbonate, may be substituted for all or a portion of the ketone , and used in the same proportions.

The polycarbonate that has been treated and crystallized may be used in the same plant, stored for later use, or packaged for transport, all in commercial quantities. Depending on the use of the crystallized polycarbonate and available equipment, the skilled worker may determine the most desirable form for the crystallized prepolymer, i.e., pellet, powder or agglomerated pellet.

SSP of Polycarbonate Prepolymer Treated with Crystallization Agent

Optionally, the prepolymer that has been crystallized by effecting contact with the crystallization agent may be converted to a polymer of higher molecular weight by solid state polymerization. The crystallized prepolymer is maintained in the solid phase by maintaining the processing temperature below the melting temperature and above the glass transition temperature of the prepolymer to yield a high molecular weight polymer. Several unexpected and advantageous effects were discovered in polycarbonate prepolymer treated with a crystallization agent preferably comprising at least about 95% by weight of an alcohol.

In a preferred embodiment, aromatic polycarbonate having a weight average average molecular weight in the range of about 5,000 to about 200,000, preferably in the range of 10,000 to about 50,000, more preferably in the range of about 15,000 to about 40,000 is formed.

The reaction temperature and time vary with the type and shape of the crystallized prepolymer, the presence or absence of a catalyst or processing aid in the prepolymer, the level of crystallinity of the prepolymer, and the morphology of the prepolymer.

It is necessary, however, to maintain the processing temperature at above the glass transition temperature of the crystallized prepolymer while maintaining the crystallized prepolymer in a solid phase state throughout the solid state polymerization process. It is preferable to conduct the SSP reaction by maintaining the temperature of the reaction system less than but as close to the $T_m$ as possible as follows:

$$T_m - 10 < T_p < T_m$$

where $T_m$ is the melting temperature of the prepolymer in degrees Celcius, $T_p$ is the reaction temperature in degrees Celcius.

As a non-limiting example, a suitable temperature for bisphenol A polycarbonate is generally in the range of about 180° C. to about 260° C., preferably in the range of about 220° C. to about 245° C.

The processing temperature should be between the $T_g$ and the $T_m$ of the crystallized polycarbonate; for aromatic polycarbonates this temperature is generally in the range of about 180° C. to about 260° C., more preferably about 220° C. to about 245° C.

It was unexpectedly found that the use of a crystallization agent comprising a secondary alcohol in the liquid or the vapor phase produced desirable effects in subsequent solid state polymerization of the prepolymer. In particular, the use of a crystallization agent comprising a secondary alcohol results in less thermal crystallization in subsequent SSP than the use of primary or tertiary alcohols.

Typically, a polycarbonate oligomer will thermally crystallize within a few minutes if held above about 200° C. The SSP reaction of this oligomer therefore results in a competition between the rate of polymerization and the rate of thermal crystallization. If the rate of thermal crystallization is faster, the polymerization rate is limited by the high crystalline fraction that inhibits chain mobility and the diffusion of phenol from the solid particulates. It is highly desirable, therefore to control the rate of thermal crystallization. During solid state polymerization, low molecular weight oligomers undergo thermal crystallization in addition to the crystallization needed at the start of the process.

Polymerization and thermal crystallization are two competing processes during SSP. Chain mobility is impeded by thermal crystallization and the difference between $\Delta H$ initial and $\Delta H$ final represents the amount of thermal crystallization during SSP. Uncontrolled crystallinity above $\Delta H$ final of about 45 joules/gram results in a precipitous fall in the reaction, and above about 60 joules/gram polymerization practically stops. Therefore, it is important to keep thermal crystallization in check.

Crystallization of the prepolymer with a secondary alcohol was found to retard the process of thermal crystallization in subsequent solid state polymerization. In one embodiment, the agent comprising the alcohol is essentially pure secondary alcohol in the vapor phase. In order to achieve the desired effect of reduced thermal crystallization, at least about 3%, by weight of the prepolymer, of secondary alcohol should be applied to the prepolymer.

In the solid state process described herein, staged heating may be employed, with rapid ramping from one temperature level to the next between instances of maintenance of the temperature at a specific level. Optionally, a large amount of inert gas, such as nitrogen, is used to ensure rapid ramping from one temperature to the next and to impede thermal crystallization. Typically, a solid state polymerization reaction must be conducted in at least four stages, as the ramping of temperature is necessary to prevent agglomeration of the polycarbonate.

It was further unexpectedly found that polycarbonate prepolymer treated with a crystallization agent comprising an alcohol yields a prepolymer which may be processed at higher temperatures during solid state polymerization, allowing the process to be conducted in fewer stages. In particular, polycarbonate prepolymer treated with a crystallization agent comprising preferably at least about 95% by weight of an alcohol may be polymerized at starting temperatures at least about 40° C. higher than polycarbonate prepolymer treated by solvents, such as acetone. The polycarbonate prepolymer treated with the crystallization agent comprising at least about 95% by weight of an alcohol may be processed in two stages.

In particular, the treated polycarbonate prepolymer may be treated in a two stage process, where the first stage may be conducted at an operating point of from about 210° C. to about 220° C., more preferably about 220° C. It is desirable to reach the first operating point as soon as possible in order to reduce the concomitant thermal crystallization that accompanies the high temperature. After a period of time at this temperature, preferably from about 1 minute to about 2 hours, more preferably about 1 hour, the temperature is ramped to from about 230° C. to about 240° C., more preferably about 240° C., as quickly as possible, and the reaction is completed at this temperature for a period of from about one to about four hours. It is preferable that the change to the second operating temperature be made immediately after the first stage. By "immediately" it is meant that the change be conducted as quickly as possible, depending on the system capabilities, preferably instantaneously.

In addition to the advantages described above, it was further unexpectedly found that polycarbonate prepared from prepolymer treated with an agent comprising a secondary alcohol produced higher molecular weights in subsequent solid state polymerization than polycarbonate prepolymer treated with tertiary or primary alcohol; and that polycarbonate prepared from prepolymer treated with an agent comprising a primary alcohol produced lower molecular weights than polycarbonate prepared from primary alcohol It was further found that among primary alcohols, branched primary alcohols produced higher molecular weights.

The rate of thermal crystallization in subsequent solid state polymerization of the crystallized prepolymer may also be controlled by accelerating the rate of solid state polymerization. As the prepolymer is brought to temperatures at which the SSP reaction occurs, the prepolymer which has been crystallized by effecting contact with the crystallization agent will undergo addition crystallization, which impedes the SSP reaction. Therefore, it is desirable to increase the rate of SSP to overcome the effect of additional crystallization caused by the thermal crystallization.

Prior to introduction into the SSP reaction system, residual moisture may be removed from the polycarbonate prepolymer by vacuum or a stream of heated gas. A stream of hot nitrogen is suitable for this purpose, for instance.

Suitable reaction systems for the solid state process include, but are not limited to, fixed bed, moving bed, tumbler, batch, continuous or a combination thereof for any of the steps including preliminary polymerization, crystallization and SSP.

During the SSP process, the process is accelerated by removing an aromatic monohydroxy compound or compounds and/or diaryl carbonate formed as by-products from the system. For this reason, an inert gas, such as nitrogen, argon, helium, carbon dioxide or a low molecular weight hydrocarbon gas may optionally be introduced to remove the aromatic monohydroxy compound or diaryl carbonate compound along with the gas when it exits from the system and/or the reaction is conducted under reduced pressure. When a gas is introduced into the reaction system, it is preferable to heat the gas to a temperature close to the reaction temperature before introducing it to the system.

Although the shape of the crystallized prepolymer used to execute the SSP reaction is not particularly restricted, it is noted that large masses react slowly and are difficult to handle, and that pellets, beads, granules and powder are better suited shapes for SSP.

Acceptable forms for the prepolymer, include, but are not limited to, pellets, cellular pellets, as discussed in section II of this specification, beads, agglomerated pellets, powder and granules. Further, the crystallized prepolymer may optionally be sized suitable for the solid state polymerization process by, for example, extrusion and die face cutting.

It was further found that polycarbonate produced by solid state polymerization utilizing the process of this invention contained less than about 400 ppm, in particular less than about 300 ppm of Fries product in the embodiment in which the polycarbonate prepolymer is prepared by the melt process. The formation of the prepolymer by the melt process is preferred. Polycarbonate produced by the interfacial process typically has a Fries content of less than 5 ppm, and nearly always has a Fries content of below about 35 ppm. Polycarbonate produced by the melt process typically has higher Fries content. As used herein the term "Fries" or "fries" refers to a repeating unit in polycarbonate having the following formula (I):

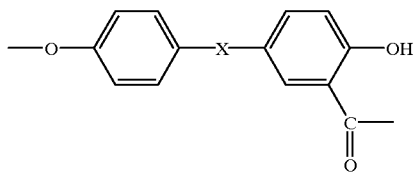

where the X variable represents

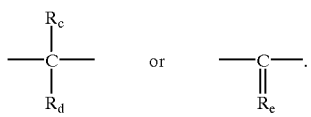

Variable $R_c$ and $R_d$ each independently represent a hydrogen atom or a monovalent hydrocarbon group and may form a ring structure. Variable $R_e$ is a divalent hydrocarbon group.

It is very desirable to have a low Fries content in the polycarbonate product, as Fries products reduce the performance characteristics of the polycarbonate, such as the ductility. Higher Fries contents results in lower ductility. Preparing polycarbonate by the melt process results in the formation of Fries products. In the embodiment where the prepolymer is prepared by the melt process, it was found that the SSP process did not add additional Fries products to the product polycarbonate. While the formation of the prepolymer by the melt process was found to produce Fries products in the amount of about 200 to 300 ppm, the SSP process according to the invention did not produce any additional Fries product.

Effect of Additives in Crystallization Agent in Rate of Subsequent SSP of Polycarbonate It was further unexpectedly found that certain additives to the crystallization agent comprising alcohol produce an increase in the rate of subsequent solid state polymerization of the crystallized polycarbonate oligomer. These additives, effective to increase the rate of subsequent solid state polymerization of polycarbonate, include, but are not limited to, plasticizers, ketones and mold release agents.

Suitable plasticizers for increasing the rate of subsequent SSP, include, but are not limited to, tetraethylene glycol dimethyl ether, dioctyl phthalate, dibutyl phthalate, n-butyl stearate, triethylene glycol di(caprylate-caprate) glycoeryl trioleate, di(2-ethylhexyl sebacate) and mixtures.

Suitable mold release agents for increasing the rate of subsequent SSP include, but are not limited to glycerol monostearate, pentaerythritol tetrastearate and mixtures thereof.

Suitable ketones for increasing the rate of subsequent SSP, include, but are not limited to 4-methyl 2-pentanone, acetone, isobutyl methyl ketone, and cyclohexanone.

If the crystallization agent comprises primary or tertiary alcohols it is preferable to include an additive effective to increase the rate of solid state polymerization in the crystallization agent. Typically, the additive or additives effective to increase the rate of subsequent SSP, if present, comprise from about 0.5 to about 5% by weight of the crystallization agent, and the alcohol from about 95 to about 99.5% by weight of the crystallization agent.

If present in the crystallization agent as an additive effective to increase the rate of solid state polymerization, the plasticizer and/or mold release agent which increases the rate of subsequent SSP should preferably be included in the crystallization agent in amounts of from about 50 ppm to about 3% by weight of the prepolymer, more preferably from about 300 ppm to about 1% by weight of the prepolymer. The plasticizer or mold release agent should comprise no more than about 2% by weight of the crystallization agent.

In contrast, if a ketone is used as an additive effective to increase the rate of solid state polymerization in the crystallization agent comprising alcohol, the ketone may comprise a greater percentage, by weight, of the crystallization agent than, for instance, the plasticizers or mold release agent without introducing deleterious effects in processing. A ketone may comprise for instance, about 20% by weight of the crystallization agent, more preferably about 10% by weight of the crystallization agent, even more preferably from about 1% to about 5% of the crystallization agent.

It was further found that other carbonyl containing compounds, such as dialkyl carbonates, function in the same manner as ketones in increasing the rate of solid state polymerization, and may be used in the same proportions as described in reference to the ketones. Suitable dialkyl carbonate for this purpose include, but are not limited to, dimethyl carbonate.

II. Polymer Pelletization

As mentioned, in a second aspect, the invention relates to a method of preparing cellular pellets from a prepolymer comprising a blowing agent, the method comprising:

a) extruding the prepolymer through a die having an output, the die maintained at conditions such that the blowing agent remains in the condensed phase in the prepolymer prior to emerging from the die; and b) upon emergence of the prepolymer through the die, substantially simultaneously cooling the prepolymer by contacting the prepolymer with a cooling agent and cutting the prepolymer; the conditions at the output of the die being maintained such that the blowing agent vaporizes in the prepolymer to form pores.

The invention further relates to cellular pellets prepared by this method, and articles prepared from the cellular pellets.

"Cooling agent" as used herein is defined as a medium which functions as a material to remove the heat of the treated prepolymer so that the prepolymer may be transformed from the molten state to the solid state at a faster or more effective rate. The cooling agent may be any fluid or substance that can absorb or conduct heat. For example, the cooling agent may be pure water or a fluid comprising water in continuous circulation to absorb heat through convection. Other cooling agents may be utilized upon exit from the die. Other cooling agents include, but are not limited to crystallization agents comprising an alcohol and a mixture of water and an agent which effects crystallization of the polycarbonate prepolymer.

"Substantially simultaneously" as used in reference to the cutting and cooling steps means that although the cutting of the prepolymer typically occurs before the cooling of the prepolymer, the time interval between the cutting and cooling is very short, typically a fraction of a second.

Pelletization is an operation common to the manufacture of many synthetic thermoplastic materials. Pelletization may be used to reduce polymers to a form suitable for storage and shipping.

The pellets formed according to the method of this invention are particularly suited for use in solid state polymerization (SSP). As discussed, partial crystallization of amorphous polycarbonate is required before SSP can be conducted. A partially crystalline shell insures that the prepolymer can sustain a temperature higher than its $T_g$ without fusing with other prepolymer. In SSP, the prepolymer may be in a variety of forms, including, but not limited to, powder, agglomerated pellets, and pellets.

The use of pellet forms is common in SSP as pellets are easily handled and prepared for processing. Pellets readily flow into measuring and dispensing apparatuses and the size of pellet charges can be readily controlled to small tolerances. Further, unlike powders, pellets are less prone to formation of dust and thus inadvertant exposure to them is limited. Thus, they provide a highly convenient form for the packaging, storage and use of thermoplastic polymers.

The method as described in this aspect of the invention may be applied to all prepolymers. It is particularly useful when subsequent crystallization and high surface area are required. Prepolymers are polymers or oligomers which are intended as feedstock for a polymer having a higher molecular weight. The molecular weight of the prepolymer may vary depending on the particular polymer being processed.

Polycarbonate prepolymer for example, preferably have a weight average average molecular weight in the range of from about 1,000 to about 20,000; and may be processed further to produce polycarbonate having weight average average molecular weights higher than about 20,000. In contrast, polyester prepolymers typically have higher number average molecular weights. The term polymers as used herein includes homopolymers, copolymers terpolymers and other combinations and forms of polymeric materials, including polymer which are elastomeric in nature.

Preferably, the prepolymer is a polymer which has properties suitable for later SSP processing. Polymers suitable for later SSP processing which may be processed according to this aspect of the invention include, but are not limited to polyesters, polyamides and polycarbonates. Particular examples suitable for processing according to this aspect of the invention include, but are not limited to polyhexymethylene adipamide (nylon 66), polyethylene terephthalate (PET), poly(butylene terephthalate) and bisphenol A polycarbonate.

The crystalline shell of pellets provides a region of higher porosity favorable for SSP, however, the pellet surface area typically increases from about 0.004 to about 0.37 m2/gram due to a network of cracks brought about by local densification from the crystallization process. While suitable for obtaining polymer having weight average molecular weights in the range of about 15,000 to about 30,000, there still exists a need for polymer having weight average molecular weights in the range of about 30,000 to about 80,000.

In one embodiment of the invention, the process of underwater pelletization is utilized to prepare cellular pellets, which may optionally be further processed by SSP. Underwater pelletizers are commonly used pelletization systems and a provided by a number of manufacturers such as GALA Industries of Eagle Rock, Va.

In an underwater pelletization system, molten polymer is extruded through die orifices into a housing which is flooded with water provided from a water circulation system which is generally temperature controlled. Cutting means, such as knives, rotating in close proximity to the die face, cut off the emerging strands of molten polymer to form pellets which are cooled in the water. The pellet and water slurry is then removed form the housing for further processing steps such as dewatering and drying. The temperature of the water is preferably in the range of about 80° C. to about 100° C., more preferably about 90° C.

Although underwater pelletization is a preferred means for preparing cellular pellets according to this aspect of the invention, other systems may be utilized to produce pellets having the desired morphology.

In the present invention, the prepolymer feedstock which is subjected to the pelletization process comprises a blowing agent that has sufficient vapor pressure such that it vaporizes inside the heated melt after exiting the die-head of the extruder. Upon exiting the die the vaporization of the blowing agent in the feedstock produces pores or "cells" in the prepolymer. Upon exiting the die-head, the hot melt is immediately cut by a rotating cutter and cooled by a cooling agent, such as water. This sudden cooling immediately solidifies the prepolymer and traps the bubbles inside the pellets, thereby producing cellular pellets.

The cellular pellets produced by this method are particularly suitable for use in SSP processes. When pellets of polycarbonate prepolymer were subsequently crystallized, they yielded surface area and internal pore structure that resulted in faster reaction rates during the subsequent SSP of the prepolymer. The cracks and voids in the cellular pellet allows crystallinity to occur in the core of the pellet, as opposed to only the shell thereby producing an internal structure to increase pellet integrity.

Cellular pellets prepared from polycarbonate prepolymer were determined to have specific surface areas up to about 60% higher than pellets of polycarbonate prepolymer prepared by the process which yields pellets without cells, or "standard" pellets.

The cellular pellets produced according to the method of the invention have an increased internal surface area of up to about 0.7 $m^2$/gram. This increased surface area promotes faster reaction during solid state polymerization. Without being bound by any theory, it is believed that the increased surface area allows enhanced diffusion paths for by products of SSP. For polycarbonates, for instance, the increased surface area would allow enhanced diffusion paths for phenol evolution.

In the embodiment in which cellular pellets are formed, the prepolymer melt must contain a "blowing agent". The blowing agent may be a by-product of the formation of the prepolymer, the blowing agent may be introduced into the prepolymer feedstock, or both.

In one embodiment, the prepolymer comprises an aromatic polycarbonate prepolymer having a weight average molecular weight of from about 1,000 to about 20,000 and having from about 5 to about 95 mole % aryl carbonate terminal end groups. During the preparation of the prepolymer feedstock, phenol and diphenylcarbonate are produced as by-products. The phenol is suitable as a blowing agent.

In addition to using by-products present in the polycarbonate prepolymer as blowing agents, a variety of blowing agents may be added to the melt to create bubbles or voids. For example, introduction of easily compressible gases, such as flourinated hydrocarbons, or of simple inert gases, such as nitrogen, into the melt during the pelletization process at wt % levels comparable to those described for phenol would effect the same result.

The blowing agent, whether present as a by-product, or added to the polymer feedstock, may be present in the prepolymer feedstock in varying amounts. Suitable ranges include from about 100 ppm to about 5 weight %, based on the weight of the prepolymer, more preferably about 0.25 to about 1% by weight, based on the weight of the prepolymer.

The blowing agent or volatile species should remain in the condensed phase or dissolved in the prepolymer at the conditions in the die head prior to discharge into the area of the second pressure. If the pressure in the die-head decreases below the vapor-pressure of the blowing agent, the vapors will escape the prepolymer melt before contacting the cooling agent. In order to obtain cellular pellets, it is important to trap a sufficient portion of the vapor bubbles in the pellets to get the desired cellular structure. In FIG. 1, the saturation vapor pressure of pure phenol and pure diphenylcarbonate are plotted as a function of temperature to illustrate a range of appropriate extrusion conditions. It is important to trap a sufficient portion of the vapor bubbles inside the pellets to obtain the desired celllular structure. Similar diagrams for other blowing agents in the prepolymer allow determination of suitable die conditions for the production of cellular pellets.

The size and internal morphology of the pellets is dependent on the extrusion conditions. In one embodiment, the phenol present in the polycarbonate prepolymer functions as the blowing agent. In this embodiment, the extrusion is preferably conducted at prepolymer feedstock temperatures of from about 190° C. to about 225° C., more preferably about 220° C. to about 225° C., even more preferably about 223° C., and pressures of atmospheric to about 100 psi.

It is preferable to maintain a constant flow rate of the prepolymer in the extruder and at conditions such that foaming of the blowing agent does not occur. If the conditions in the system are not maintained properly, hollow pellets or foamed pellets insufficient for handling may result. Hollow or foamed pellets are fragile due to low density.

In one embodiment, the prepolymer is fed into an extruder in the form of a solid, such as a powder, cellular pellet, or agglomerated pellet. The extruder is than ramped from a first temperature and atmospheric pressure to a first pressure in the die-head. Upon exiting the die-head the melt enters a zone at a second pressure, at which the blowing agent vaporizes to produce the cellular pellets. Upon entering the zone of second pressure, the prepolymer melt is substantially simultaneously cooled and cut to produce the cellular pellets. Alternatively, the prepolymer may be directly fed to the pelletizer in the form of a melt.

The first and second pressures may be varied, however the second pressure should be maintained lower than the first pressure. It is desirable to maintain a pressure differential of at least about 100 psi between the first and second pressures. In one embodiment, the second pressure in maintained at ambient pressure and the first pressure is maintained at about 100 psi. Alternatively, the second pressure may be maintained at pressures other than ambient; however, the pressure differential between the first and second pressures should preferably be at least about 100 psi.

The size of the pellet formed is dependent on the processing conditions, including the flow rate of the prepolymer and the cutting speed. It is desirable to obtain pellets of a uniform size, having a low aspect ratio. If the pellet is too long, flowability may be impeded.

In general, it is desirable to obtain cellular pellets having a generally spherical form. The length of the pellets is preferably in the range of about 2 mm to about 8 mm, more preferably about 2 mm to about 4 mm, even more preferably about 3 mm. The width of the pellets is preferably about 2 to about 3 mm, even more preferably about 2.5 mm. The prepolymer melt flow rate and the cutting speed of the cutting means may be synchronized to produce pellets of the desired dimensions.

In an alternative embodiment, a pellet of polycarbonate prepolymer may be formed that does not have cells. These pellets are herein referred to as "standard" pellets. The standard pellets are produced in the same manner as the cellular pellets, except that the extrusion is conducted at temperatures in the range of below about 190° C. These standard pellets, which do not contain the cells, are suitable for the preparation of lower molecular weight materials, such as for use in optical disks. Such materials have weight average molecular weights in the range of from about 25,000 to about 35,000. The dimensions of the standard pellets are preferably the same as those described for cellular pellets.

The standard pellets or cellular pellets may be used in the same plant after being made, stored for later use, or packaged for transport, all in commercial quantities. If desired the standard pellets or cellular pellets may be crystallized in accordance with the method described in section I and used in the same plant after being made, stored for later use, or packaged for transport, all in commercial quantities.

SSP of Prepolymer Prepared by Pelletization Process

As mentioned, is desirable to use the cellular pellets in SSP processes. For polycarbonate for instance, the increased surface area translates directly into faster removal of phenol, thereby increasing the rate of SSP. Alternatively, the standard pellets may be used to prepare materials having lower molecular weight, such as for optical disk applications.

In one embodiment, the cellular pellets from an underwater pelletization process may be dewatered and introduced into a reactor in which SSP may be effected. Prior to or after introduction into the reactor, the cellular pellets are crystallized to a level sufficient to allow SSP to proceed effectively.

If the prepolymer is a polycarbonate prepolymer, for instance, the prepolymer is subjected to a crystallization step. In a preferred embodiment, the cellular pellets prepared from the polycarbonate prepolymer, as described in section 1, is crystallized in accordance with the method described in Section I of this specification.

Alternatively, other suitable nonsolvents or solvents may be used to crystallize the polycarbonate prepolymer. Nonlimiting examples of solvents useful in the present invention for crystallizing the amorphous prepolymer include aliphatic halogenated hydrocarbons, such as methyl chloride, methylene chloride, chloroform, carbon tetrachloride, chloroethane, dichloroethane, trichloroethane, trichlorethylene, tetrachlorethane and mixtures thereof; aromatic halogenated hydrocarbons, such as chlorobenzene and dichlorobenzene, ethers, such as tetrahydrofuran and dioxane esters such as methyl acetate and ethyl acetate, ketones such as acetone and methyl ethyl ketone; and aromatic hydrocarbons such as benzene, toluene and xylene. Preferred solvents include ethers such as tetrahydrofuran and dioxane, esters such as methyl acetate and ethyl acetate; and ketones such as acetone and methyl ethyl ketone. Acetone is the more preferred solvent. Optionally, water may be added as a diluent to the solvent.

The SSP process may be conducted under a variety of processing conditions such that a polymer of the desired molecular weight is obtained. If the prepolymer is polycarbonate treated with the crystallization agent described in section I of the specification, the process may be conducted in two stages with the advantages described in Section I, above.

This invention has been described in detail with particular reference to preferred embodiments thereof, but it will be understood that variations and modifications can be effected within the spirit and scope of the invention.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in ° C. or is at room temperature. In the processes described, unless stated otherwise, the pressure is at or near atmospheric.

The materials and testing procedures used for the results shown herein are as follows:

Molecular weights are reported as weight average ($M_w$), unless noted otherwise, and were determined by gel permeation chromatography relative to polystyrene.

Number average molecular weights ($M_n$) were determined by gel permeation chromatography.

$T_g$ values were determined by differential scanning calorimetry.

$T_m$ values were determined by differential scanning calorimetry.

In the following tables, the process steps may be read as follows:

220/1+230/4 would be interpreted as 1 hour at 220° C. followed by 4 hours at 230° C.

Example 1

Samples of cellular pellets were produced using a GALA underwater pelletizer. The temperature of the melt was 222.80° C. The pellets were crystallized using alcohol vapor at a temperature of 150° C. with pure isopropanol vapor for one hour. The cellular pellets were produced at the following conditions. The die and extruder temperature were 223° C. and the melt feed rate and cutting rate were speed synchronized to produce pellets having a length of 3 millimeters (mm) and a diameter of 3 mm. These pellets were designated as Gala #15 pellets. Gala #15 pellets were cellular pellets. The cooling agent was water, and the temperature of the water was 90° C. The die pressure was 100 psi.

The standard pellets were produced at the following conditions. The conditions were the same as those set forth above for the Gala #15 pellets, except that the extruder temperature was 190° C. The following chart sets forth the properties of cellular pellets and standard pellets.

polymerization and provides mold releasing properties in downstream processing.

A) 5.6 grams of 3-pentanol and 1% by weight of the polymer of pentaerythritol tetrastearate (PETS) were charged into a pressurizable vessel and 12 grams of GALA #15 pellets were suspended on a screen. The vessel was heated at a temperature of 150° C. for 1 hour, at the saturation pressure of 3-pentanol of about 1.2 atmospheres, and then cooled to ambient temperature. The resultant crystalline pellets were subjected to solid state polymerization according to the protocol given in Table 2.

TABLE 2

| Stage | Temp/Time (° C./hr) | $T_g$ (° C.) | $T_m$ (° C.) | $M_2$ | $M_n$ |
|---|---|---|---|---|---|
| 1 | Initial sample | 116 | 212 | 15400 | 5400 |
| 2 | 200/0.5 + 220/0.5 + 230/1 | 148 | 254 | 49150 | 21450 |
| 3 | 200/0.5 + 220/0.5 + 230/1 + 240/1 | 149.5 | 256 | 60400 | 26100 |
| 4 | 200/0.5 + 220/0.5 + 230/1 + 240/1.5 | 151 | 256 | 67900 | 27100 |

B) 5.6 grams of 3-pentanol and 1% by weight of the prepolymer of glycerol monostearate (GMS) were charged into a pressurizable vessel. 12 grams of amorphous pellets were suspended on a screen. The vessel was heated at 150° C. for one hour, at the saturation pressure of 3-pentanol of about 1.2 atmospheres, and then cooled to ambient temperature. The resultant crystalline pellets were subjected to solid state polymerization according to the protocol given in Table 3.

TABLE 3

| Stage | Temp/Time (° C./hr) | $T_g$ (° C.) | $T_m$ (° C.) | $M_2$ | $M_n$ |
|---|---|---|---|---|---|
| 1 | Initial sample | 120 | 224 | 19600 | 6000 |
| 2 | 200/0.5 + 220/0.5 + 230/1 | 149 | 255 | 49100 | 21300 |
| 3 | 200/0.5 + 220/0.5 + 230/1 + 240/1 | 149 | 256 | 59500 | 24400 |
| 4 | 200/0.5 + 220/0.5 + 230/1 + 240/1.5 | 152 | 260 | 64700 | 26500 |

Comparative Example C)

C) 8 grams of pure 3-pentanol were charged in a pressurizable vessel and 12 grams of amorphous pellets were

TABLE I

| Run | Pellet | Agent | Temp(° C.)/Time/(hr) | $T_g$ | $T_m$ | $M_w$*1000 | $M_n$*1000 | $M_w/M_n$ |
|---|---|---|---|---|---|---|---|---|
| 1 | Cellular | MeOH | 230/4 | 141 | 273 | 36 | 15 | 2.4 |
| 2 | Standard | MeOH | 230/4 | 139 | 263 | 25 | 11 | 2.3 |
| 3 | Cellular | MeOH | 230/30 | 142 | 295 | 28 | 12 | 2.3 |
| 4 | Standard | MeOH | 230/10 | 133 | 284 | 21 | 9 | 2.3 |
| 5 | Cellular | 3-pentanol | 210/1 + 230/1 + 240/6 | 142 | 282 | 41 | 17 | 2.4 |
| 6 | Standard | 3-pentanol | 210/1 + 230/1 + 240/6 | 137 | 270 | 29 | 11 | 2.3 |

Example 2

This example shows that effecting crystallization with a crystallization agent comprising an alcohol and a mold release agent as an additive increases the rate of solid state suspended on a screen. The vessel was heated at 150° C. for 1 hour, at the saturation pressure of 3-pentanol of about 1.2 atmospheres, and then cooled to room temperature. The resultant crystalline pellets were subjected to solid state polymerization according to the protocol given in Table 4.

TABLE 4

| Stage | Temp/Time (° C./hr) | $T_g$ (° C.) | $T_m$ (° C.) | $M_2$ | $M_n$ |
|---|---|---|---|---|---|
| 1 | Initial sample | 111 | 222 | | |
| 2 | 200/0.5 + 220/0.5 + 230/1 | 143 | 256 | 40800 | 16900 |
| 3 | 200/0.5 + 220/0.5 + 230/1 + 240/1 | 147 | 259 | 47600 | 19600 |
| 4 | 200/0.5 + 220/0.5 + 230/1 + 240/1.5 | 149 | 263 | 5500 | 23700 |

Example 3

This example shows that the alcohol, i.e., primary, secondary or tertiary, in the crystallization agent has an effect on the final molecular weight of the polymer.

The prepolymer used for this study was in the pellet form, approximately 3 mm×9 mm. These pellets were exposed to different alcohol vapors at 150° C., at the saturation pressure of the crystallization agent, for 1 hour for crystallization. Primary, secondary and tertiary alcohols were used for this study. The crystalline pellets were subjected to SSP in the temperature range of 200 to 240° C. under a flow of nitrogen at atm. In all cases, crystallization and SPP were performed under identical conditions.

Alcohol (10 gm) was charged in a crystallization apparatus consisting of a pressurizable vessel and amorphous pellets (11.5 g) were suspended on the screen. The vessel was heated at 150° C. for 1 hour, at the saturation pressure of the crystallization agent, and then cooled it to room temperature. The resultant crystalline pellets were subjected to solid state polymerization according to the protocol given in Table 1.

Alcohol Used for this Study:

Primary alcohol: methanol, isobutanol, 1-pentanol

Secondary alcohol: 2-propanol, 3-pentanol

Tertiary alcohol: t-butanol

From the results, shown in Table 5, it was found that PC crystallized from secondary alcohol produce highest molecular weight whereas primary alcohols produce lowest molecular weight. Again among the primary alcohol when there is a branching, better results were obtained compared to linear primary alcohol. The experimental data and results are given below:

| Temp/time (° C./h) | Isobutanol | | 1-Pentanol | |
|---|---|---|---|---|
| | Tg (° C.) | Mw | Tg (° C.) | Mw |
| Initial Sample | 109 | 9540 | 109 | 9540 |
| After crystallization | 114 | 13713 | | 9995 |
| 200/0.5 + 230/0.5 + 230/1 | 145 | 42882 | 135 | 27550 |
| 200/0.5 + 230/0.5 + 230/1 + 240/1 | 148 | 44050 | 139 | 32570 |
| 200/0.5 + 230/0.5 + 230/1 + 240/2 | 148 | 48500 | 139 | 32350 |

Example 4

This example shows that controlling the crystallinity of the prepolymer is desirable in order to ensure efficient SSP, and that secondary alcohols help to minimize the process of thermal crystallization. Different types of alcohols as well as additives in alcohols can be used to control thermal crystallinity during SSP, as given by ΔH final in Table 6. In particular, the addition of rate enhancing additives in crystallization agents comprising primary and tertiary alcohols helps to minimize the effects of thermal crystallization.

In this series of examples, 10 grams of the alcohol and 1% of the additives by weight of the prepolymer were charged into a pressurizable vessel with 11.5 grams of amorphous pellets suspended in a screen basket. Gala #15 pellets were contacted with vapor phase alcohol. The vessel was heated at 150° C. for 1 hour and at the saturation pressure of the alcohol, and then cooled to ambient temperature. The resultant crystalline pellets were subjected to solid state polymerization according to the protocol shown in Table 6.

TABLE 5

| Temp/time (° C./h) | Methanol | | 3-Pentanol | | 2-Propanol | | t-Butanol | |
|---|---|---|---|---|---|---|---|---|
| | Tg (° C.) | Mw | Tg (° C.) | Mw | Tg (° C.) | Mw | Tg (° C.) | Mw |
| Initial Sample | 109 | 9540 | 109 | 9540 | 109 | 9540 | 109 | 9540 |
| After crystallization | 105 | 6530 | 114 | 11200 | 121 | 16200 | 114 | 17270 |
| 200/0.5 + 230/0.5 + 230/1 | 128 | 18473 | 148 | 47700 | 148 | 53400 | 146 | 42400 |
| 200/0.5 + 230/0.5 + 230/1 + 240/1 | 133 | 23448 | 149 | 59870 | 151 | 63700 | 148 | 48450 |
| 200/0.5 + 230/0.5 + 230/1 + 240/2 | 137 | 25508 | 151 | 64576 | 151 | 69950 | 149 | 55950 |

TABLE 6

| Run | System | Reaction Temp/time (° C./h) | $T_m$ Initial ° C. | $T_m$ Final ° C. | $\Delta H$ initial J/gm | $\Delta H$ final J/gm | $M_w$ | $M_n$ |
|---|---|---|---|---|---|---|---|---|
| 1 | Methanol | 200/0.5 + 220/0.5 + 230/1 + 240/2 | 225 | 291 | 39 | 68 | 25500 | 9408 |
| 2 | Hexanol | 220/3 + 230/2 + 240/8 | 224 | 299 | 22 | 61 | 48000 | 18800 |
| 3 | 3-pentanol | 220/3 + 230/2 + 240/8 | 222 | 284 | 25 | 44 | 56000 | 23100 |
| 4 | 3-pentanol | 200/0.5 + 220/0.5 + 230/1 + 240/3 | | 263 | | 31 | 55000 | 23750 |
| 5 | Methanol + TEGDME (1%) | 200/0.5 + 220/0.5 + 230/1 + 240/1.5 | 225 | 280 | 34 | 62 | 31750 | 11700 |
| 6 | 3-pentanol + TEGDME (1%) | 200/0.5 + 220/0.5 + 230/1 + 240/2 | 224 | 255 | 28 | 18 | 69700 | 24700 |
| 7 | 3-pentanol + PETS (1%) | 200/0.5 + 220/0.5 + 230/1 + 240/2 | 212 | 256 | 32 | 14 | 67900 | 27100 |
| 8 | 3-pentanol + GMS (1%) | 200/0.5 + 220/0.5 + 230/1 + 240/2 | 224 | 260 | 25 | 22 | 64700 | 27300 |

Example 5

This example shows that application of the crystallization agent comprising a plasticizer increases the rate of solid state polymerization of subsequently polymerized prepolymer.

A) 32 grams of 3-pentanol and 1% by weight with respect to the 3-pentanol of glycol dimethyl ether(TEGDME) were charged into a pressurizable vessel and 12 grams of GALA #15 pellets were placed on a screen. The vessel was heated at 150° C. for one hour at the saturation pressure of the alcohol (approximately 1.2 atmospheres) and then cooled to room temperature. The resulting crystalline pellets were subjected to solid state polymerization according to the protocol set forth in Table 7.

TABLE 7

| Run | Temp/Time (° C./h) | $T_g$ | $T_m$ | $M_w$ | $M_n$ |
|---|---|---|---|---|---|
| 1 | Initial | | | | |
| 2 | 200/0.5 + 220/0.5 + 230/1 | 147 | 248 | 51300 | 19650 |
| 3 | 200/0.5 + 220/0.5 + 230/1 + 240/1 | 152 | 260 | 66000 | 24100 |
| 4 | 200/0.5 + 220/0.5 + 230/1 + 240/1.5 | | | 69700 | 24700 |

B) 8 grams of 3-pentanol and 1500 ppm, with respect to the 3-pentanol, of tetraethylene glycol dimethyl ether (TEGDME) were charged into a crystallization apparatus consisting of a pressurizable vessel and 12 grams of GALA #15 pellets were placed on the screen. The vessel was heated at 150° C. for 1 hour at the saturation pressure of the alcohol and cooled to room temperature. The resultant pellets were subjected to SSP according to the protocol given in Table 8

TABLE 8

| Run | Temp/Time (° C./h) | $T_g$ | $T_m$ | $M_w$ | $M_n$ |
|---|---|---|---|---|---|
| 1 | Initial | 122 | 219 | | |
| 2 | 200/0.5 + 220/0.5 + 230/1 | 148 | 255 | 45400 | 20800 |
| 3 | 200/0.5 + 220/0.5 + 230/1 + 240/1 | 150 | 258 | 54000 | 23800 |
| 4 | 200/0.5 + 220/0.5 + 230/1 + 240/2 | 150 | 257 | 61300 | 28500 |

C) 8 grams of 3-pentanol and 1000 ppm, with respect to the 3-pentanol, of tetraethylene glycol dimethyl ether (TEGDME) were charged into a crystallization apparatus consisting of a pressurizable vessel and 12 grams of GALA #15 pellets were placed on the screen. The vessel was heated at 150° C. for 1 hour at the saturation pressure of the alcohol and cooled to room temperature. The resultant pellets were subjected to SSP according to the protocol given in Table 9.

TABLE 9

| Run | Temp/Time (° C./h) | $T_g$ | $T_m$ | $M_w$ | $M_n$ |
|---|---|---|---|---|---|
| 1 | Initial | | | | |
| 2 | 200/0.5 + 220/0.5 + 230/1 | 146 | 258 | 45760 | 20900 |
| 3 | 200/0.5 + 220/0.5 + 230/1 + 240/1 | 149 | 260 | 53450 | 24670 |
| 4 | 200/0.5 + 220/0.5 + 230/1 + 240/2 | 150 | 262 | 57280 | 26230 |

Comparative Example D)(no additives)

D) 8 grams of 3-pentanol were charged into a crystallization apparatus consisting of a pressurizable vessel and 12 grams of GALA #15 pellets were placed on the screen. The vessel was heated at 150° C. for 1 hour at the saturation pressure of the alcohol and cooled to room temperature. The resultant pellets were subjected to SSP according to the protocol given in Table 10.

TABLE 10

| Run | Temp/Time (° C./h) | $T_g$ | $T_m$ | $M_w$ | $M_n$ |
|---|---|---|---|---|---|
| 1 | Initial | 111 | 222 | | |
| 2 | 200/0.5 + 220/0.5 + 230/1 | 143 | 256 | 40800 | 16900 |
| 3 | 200/0.5 + 220/0.5 + 230/1 + 240/1 | 147 | 259 | 47600 | 19600 |
| 4 | 200/0.5 + 220/0.5 + 230/1 + 240/3 | 149 | 263 | 55000 | 23700 |

Example 6

This example shows that application of the crystallization agent comprising a ketone increases the rate of solid state polymerization of subsequently polymerized prepolymer.

A) 8 grams of 3-pentanol were charged into a crystallization apparatus consisting of a pressurizable vessel and 12 grams of GALA #15 pellets were placed on the screen. In this instance, 2% of 4 methyl 2-pentanone was added to 98% of 3-pentanol. The vessel was heated at 150° C. for 1 hour at the saturation pressure of the alcohol (approximately 1.2 atmospheres), and cooled to room temperature. The resultant pellets were subjected to SSP according to the protocol given in Table 11.

TABLE 11

| Run | Temp/Time (° C./h) | $T_g$ | $T_m$ | $M_w$ | $M_n$ | $M_w/M_n$ |
|---|---|---|---|---|---|---|
| 1 | Initial | 116 | 224 | | | |
| 2 | 200/0.5 + 220/0.5 + 230/1 | 147 | 276 | 48000 | 21100 | 2.27 |
| 3 | 200/0.5 + 220/0.5 + 230/1 + 240/2 | 149 | 269 | 60000 | 24350 | 2.46 |
| 4 | 200/0.5 + 220/0.5 + 230/1 + 240/3 | 150 | 282 | 61000 | 26000 | 2.35 |
| 5 | 200/0.5 + 220/0.5 + 230/1 + 240/4 | 153 | 273 | 65600 | 24500 | 2.57 |
| 6 | 200/0.5 + 220/0.5 + 230/1 + 240/6 | 155 | 268 | 85000 | 32600 | 2.6 |

B) Comparative Example

In this example, no ketone was added. 8 grams of 3-pentanol were charged into a crystallization apparatus consisting of a pressurizable vessel and 12 grams of GALA #15 pellets were placed on the screen. The vessel was heated at 150° C. for 1 hour and at the saturation pressure of the 3-pentanol (approximately 1.2 atmospheres) and cooled to room temperature. The resultant pellets were subjected to SSP according to the protocol given in Table 12.

TABLE 12

| Run | Temp/Time (° C./h) | $T_g$ | $T_m$ | $M_w$ | $M_n$ | $M_w/M_n$ |
|---|---|---|---|---|---|---|
| 1 | Initial | 111 | 222 | | | |
| 2 | 200/0.5 + 220/0.5 + 230/1 | 143 | 256 | 40800 | 16900 | 2.41 |
| 3 | 200/0.5 + 220/0.5 + 230/1 + 240/1 | 147 | 259 | 47600 | 19600 | 2.42 |

TABLE 12-continued

| Run | Temp/Time (° C./h) | $T_g$ | $T_m$ | $M_w$ | $M_n$ | $M_w/M_n$ |
|---|---|---|---|---|---|---|
| 4 | 200/0.5 + 220/0.5 + 230/1 + 240/3 | 149 | 263 | 55000 | 23700 | 2.32 |
| 5 | 220/3 + 230/2 + 240/6 | 154 | 284 | 56000 | 23700 | 2.32 |

C) In this further example, according to the invention, 50 grams of GALA #15 pellets were exposed to a crystallization agent comprising isopropyl alcohol (IPA) as set forth in Table 1. In experiment Number 1, the crystallization agent comprised 5% acetone, by weight of the crystallization agent. Crystallization was effected for 1 hour at 150° C. at the saturation pressure of the alcohol. The cellular pellets were polymerized at 220° C. for 1 hour, followed by polymerization at 240° C. for 4 hours. During the process, an inert gas sweep of 3 liters/minute of nitrogen was maintained.

TABLE 13

| Experiment No. | Solvent (%) | Mwt | $T_g$ (° C.) | $T_m$ (° C.) | $T_m$ onset (° C.) | ΔH (J/g) |
|---|---|---|---|---|---|---|
| 1 starting oligomer | IPA + Acetone (95:5) | 14550 | 106 | 228 | 185 | 30[b] |
| Product | | 48500 | 147 | 277 | 240 | 44 |
| 2 starting oligomer | IPA (100) | 12600 | 103 | 232 | 181 | 29[b] |
| Product | | 42680 | 144 | 275 | 260 | 53 |

[b]Starting oligomer

This invention has been described in detail with particular reference to preferred embodiments thereof, but it will be understood that variations and modifications can be effected within the spirit and scope of the invention.

What is claimed is:

1. A method of crystallizing an aromatic polycarbonate prepolymer having a weight average molecular weight of from about 1,000 to about 20,000 and having from about 5 to about 95 mole % aryl carbonate terminal end groups, based on total end groups, the method comprising:
   a) effecting contact of the prepolymer with a crystallizing agent comprising an alcohol and an additive, wherein the additive is effective to increase the rate of solid state polymerization.

2. The method of claim 1, wherein the additive is a ketone, a plasticizer, or a mold release agent.

3. The method of claim 1, wherein the alcohol comprises at least about 95% by weight of the crystallization agent.

4. A method of crystallizing an aromatic polycarbonate having a weight average molecular weight in the range of from about 1,000 to about 20,000 and having from about 5 to about 95 mole % aryl carbonate terminal end groups, based on total end groups, the method comprising:
   a) effecting contact of the prepolymer with a crystallizing agent comprising a primary or a tertiary alcohol, wherein the primary alcohol is applied to the prepolymer in the vapor phase; wherein the crystallizing agent further comprises an additive effective to increase the rate of solid state polymerization.

5. The method of claim 4, wherein the additive effective to increase the rate of solid state polymerization is selected from the group consisting of a plasticizer, a mold release agent, a ketone and a mixture thereof.

6. A method of preparing an aromatic polycarbonate comprising the steps of
   a) applying a crystallizing agent comprising a primary alcohol in the vapor phase to a prepolymer having a weight average molecular weight of from about 1,000 to about 20,000 and having from about 5 to about 95 mole % aryl carbonate terminal end groups, based on total end groups, thereby forming a crystallized prepolymer, and
   b) heating the crystallized prepolymer to a reaction temperature above the prepolymer glass transition temperature and below the melting temperature of the prepolymer,
      wherein the crystallizing agent further comprises an additive effective to increase the rate of solid state polymerization.

7. The method of claim 6, wherein the additive effective to increase the rate of solid state polymerization is selected from the group consisting of a plasticizer, a mold release agent, a ketone and a mixture thereof.

8. The method of claim 1, wherein the primary alcohol is linear.

9. The method of claim 6, wherein the primary alcohol is branched.

10. A method of increasing the rate of solid state polymerization during the preparation of an aromatic polycarbonate from a prepolymer, the method comprising
   a) applying to the prepolymer a crystallizing agent comprising an alcohol and an additive, the additive comprising a substance effective to increase the rate of solid state polymerization, thereby forming a crystallized polycarbonate, wherein the crystallization agent is in the vapor phase.

11. The method of claim 10, further comprising the step of solid state polymerizing the crystallized polycarbonate.

12. The method of claim 10, wherein the additive effective to increase the rate of solid state polymerization comprises a ketone, a plasticizer, a mold release agent, or a mixture thereof.

13. The method of claim 40, wherein the additive effective to increase the rate of solid state polymerization comprises a ketone.

14. A method of increasing the rate of solid state polymerization during the preparation of an aromatic polycarbonate from an aromatic polycarbonate prepolymer, the method comprising
   a) applying to the prepolymer crystallizing agent comprising a primary or tertiary alcohol and a ketone, the primary or tertiary alcohol and the ketone being applied in the vapor phase, the ketone being effective to increase the rate of solid state polymerization.

15. The method of claim 14, wherein the ketone comprises from 1 to 20% of the crystallization agent, and wherein the alcohol comprises from 80 to 99% of the crystallization agent.

16. A method of increasing the rate of solid state polymerization during the preparation of aromatic polycarbonate from a prepolymer, the method comprising:
   a) applying to the prepolymer an agent comprising a primary or tertiary alcohol and a plasticizer, the primary or tertiary alcohol and the plasticizer being applied in the vapor phase, the plasticizer being effective to increase the rate of solid state polymerization.

17. The method of claim 16, wherein the plasticizer is tetraethylene glycol dimethyl ether.

18. A method of increasing the rate of solid state polymerization during the preparation of an aromatic polycarbonate from a prepolymer, the method comprising:
   a) applying to the prepolymer an agent comprising a primary or tertiary alcohol and a mold release agent, the primary or tertiary alcohol and the mold release agent being applied in the vapor phase, the mold release agent being effective to increase the rate of solid state polymerization.

19. A method of controlling the crystallinity of a polycarbonate during solid state polymerization, the method comprising the steps of
   a) applying a crystallization agent comprising a primary alcohol, secondary alcohol, tertiary alcohol or a mixture thereof to a prepolymer; the agent applied in an amount effective to at least partially crystallize the prepolymer, the agent selected in the amount and proportion necessary to effect the desired crystallinity.

20. The method of claim 19, wherein the crystallization agent further comprises an additive effective to increase the rate of solid state polymerization.

* * * * *